Sept. 2, 1930.    N. P. SJOBRING    1,774,731
DRAFTSMAN'S PROTRACTOR
Filed Aug. 10, 1928
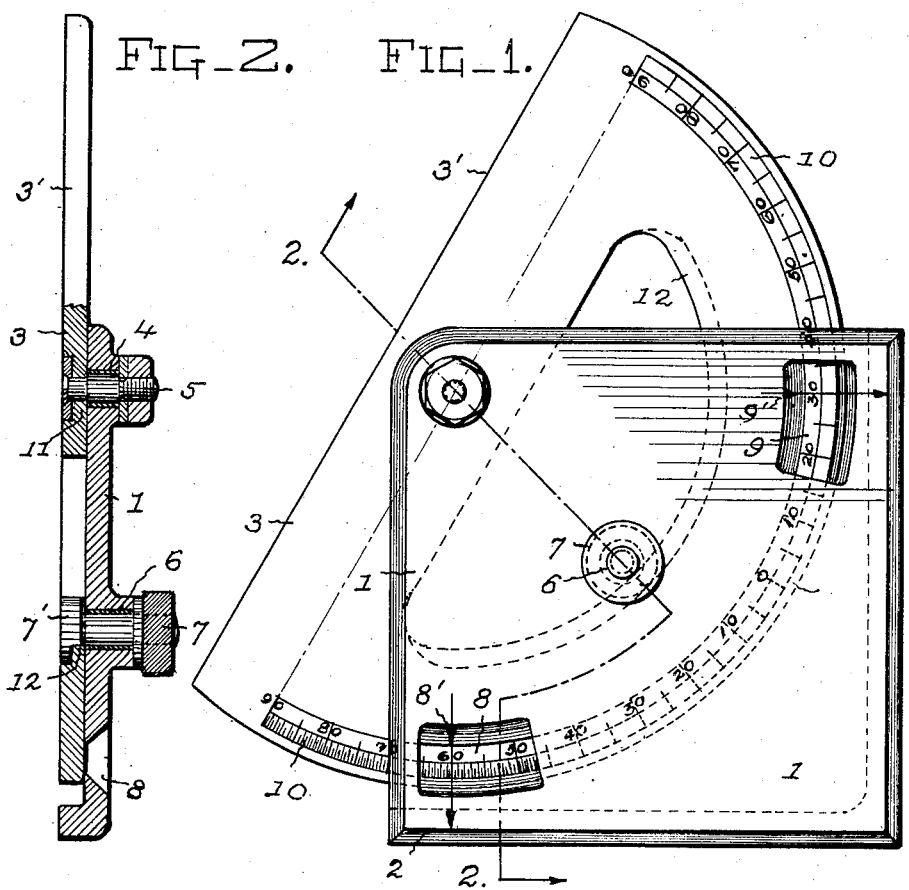
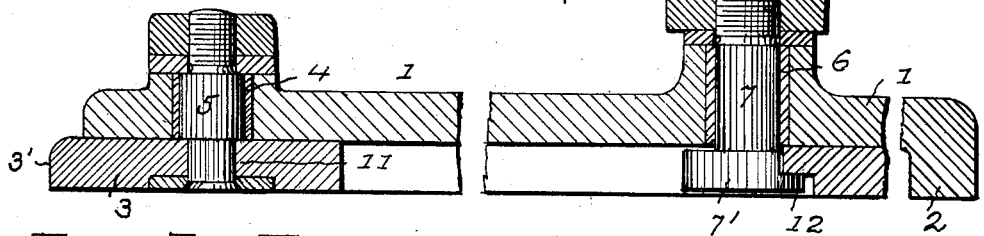
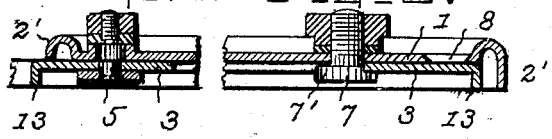
INVENTOR:
NELS P. SJOBRING,
by Robert Burns
ATT'Y.

Patented Sept. 2, 1930

1,774,731

UNITED STATES PATENT OFFICE

NELS P. SJOBRING, OF CHICAGO, ILLINOIS

DRAFTSMAN'S PROTRACTOR

Application filed August 10, 1928. Serial No. 298,825.

This invention relates to the type of protractors adapted for use by draftsmen in connection with a straight edge or with a T square in the production of angularly disposed lines of any required inclination, and this improvement has for its object.

To provide a structural formation and combination of parts in a protractor of the above mentioned type, of a simple and compact nature adapted for use by draftsmen, students and even school children learning the drafting art in its various branches, due to its simplicity and ability to afford reading or indication of the degrees both to horizontal and vertical base lines, all as will hereinafter more fully appear.

In the accompanying drawings:

Fig. 1, is an elevation of a draftsman's protractor embodying the preferred form of the invention.

Fig. 2, is a transverse section on line 2—2 Fig. 1.

Fig. 3, is an enlarged detail section of the pivotal connection between the holder plate and the adjustable ruling sector plate of the instrument.

Fig. 4, is a similar view of the clamping or holding means between said parts.

Figs. 5 and 6, are views corresponding with Figs. 3 and 4, or modified forms of the protractor parts.

Like reference numerals indicate like parts in the several views.

In the present improvement the supporting base or holding member 1 of the instrument is formed of plate metal or the like, with one corner of the member of a rounded formation as shown. In addition the member 1 is provided with a marginal flange 2 along the full extent of the two of its edges and partly along the other two edges for the purpose of providing on the under side of the member a receiving cavity for the hereinafter described adjustable sector shaped ruling frame 3 of the instrument.

Said holder plate or base member 1 is formed with an orifice 4 near one corner for the reception of the pivot stud or bolt 5, by which the sector frame ruling member 3, above referred to, is pivotally connected to the holder plate 1. In addition the holder plate 1 is formed with an orifice 6 in its central portion for the reception of the clamping bolt 7 by which the ruling member 3 aforesaid, is clamped in place and in the required angular relation to the bearing edges of the holder plate 1.

View openings or windows 8 and 9 are formed in other and diagonal corners to the pivot opening 4 of the base 1, with such openings provided with pointer marks 8' and 9' in exact right angle alignment with the axis of said pivot orifice 4 and with said marks adapted to register with graduations on the sector shaped ruling member 3 to indicate the degree of adjustment of the same in relation to the base 1.

The sector shape ruling member 3 of the instrument is formed along its curved edge with a semi-circular scale or graduations 10 of any suitable nature, with said scale 10 showing through the view openings 8 and 9, and positioned in symmetrical relation to the straight ruling edge 3" of the member, which ruling member at the axis of such semi-circular scale 10, is formed with a pivot orifice 11 complementary to the pivot orifice 4 of the base 1, with said orifices adapted to receive the pivot stud or bolt 5 by which the parts are pivotally connected together.

The central portion of the sector shape ruling member 3 is of an open formation, to provide a concave bearing edge 12, concentric with the pivot axis of the member and adapted to have side bearing engagement on the head 7' of the clamping bolt 7 above referred to.

The base 1 is usually formed with a solid reinforcing flange 2 on its edges, as shown in Figs. 2 and 4, but where a lighter structure is desired, beaded folds or flanges 2' may be used instead of the solid flange 2, above described. In such lighter structure the ruling member 3 will be provided with a reinforcing flange 13 as shown in Figs. 5 and 6.

I claim as my invention:

1. In a protractor of the type described, the combination of a sector shaped ruling member formed with a pivot orifice, a straight ruling edge, a semi-circular scale or graduation in symmetrical relation to said ruling edge, and an open center recessed along an inner circular edge concentric with the pivot axis of the member, a holder or base plate having a square form and having a pivot orifice at one corner and a bolt receiving orifice near the center and provided with view openings adjacent the corners nearest to said pivot orifice corner, a pivot stud connecting the ruling member and holder or base plate together, and a clamping bolt arranged in the bolt receiving orifice aforesaid of said holder plate and having a head shaped to engage the aforesaid recessed edge of the ruling member.

2. In a protractor of the type described, the combination of a sector shaped ruling member formed with a pivot orifice, a straight ruling edge, a semi-circular scale or graduation in symmetrical relation to said ruling edge, and an open center recessed along an inner circular edge concentric with the pivot axis of the member, a holder or base plate having a square form and having a pivot orifice at one corner and a bolt receiving orifice near the center and provided with view openings adjacent the corners nearest to said pivot orifice corner, a pivot stud connecting the ruling member and holder or base plate together, and a clamping bolt arranged in the bolt receiving orifice aforesaid of said holder plate and having a head shaped to engage the aforesaid recessed edge of the ruling member, the holder or base plate having a reinforcing flange formation the full extent of two of its edges forming the angle diagonally opposite to the aforesaid pivot orifice angle.

In testimony whereof I hereunto affix my signature.

NELS P. SJOBRING.